United States Patent [19]
Sweet

[11] 3,899,600
[45] Aug. 12, 1975

[54] ADDITIVE COMPOSITION FOR REDUCED PARTICLE SIZE MEATS IN THE CURING THEREOF

[75] Inventor: Clyde W. Sweet, Ann Arbor, Mich.

[73] Assignee: Eastman Kodak Company, Rochester, N.Y.

[22] Filed: Nov. 18, 1974

[21] Appl. No.: 524,440

[52] U.S. Cl. ............... 426/532; 426/652; 426/224; 426/250; 426/266; 426/332; 426/646
[51] Int. Cl.² .......................................... A23L 1/31
[58] Field of Search .......... 426/151, 177, 212, 213, 426/224, 250, 264, 265, 266, 321, 332; 424/65

[56] References Cited
UNITED STATES PATENTS

| | | | |
|---|---|---|---|
| 2,226,177 | 12/1940 | Orelup et al. | 424/65 |
| 2,828,212 | 3/1958 | Sair | 426/213 |
| 2,992,116 | 7/1961 | Sair | 426/177 |
| 3,032,420 | 5/1962 | Ferrari | 426/250 |
| 3,154,423 | 10/1964 | Voegeli et al. | 426/224 |

*Primary Examiner*—Hyman Lord

[57] ABSTRACT

The addition of suitable amounts of certain phosphate salts and tertiary-butylhydroquinone to non-nitrite containing meat products impart taste qualities equivalent to that provided by sodium or potassium nitrite, and when used in conjunction with preservatives such as the parabens or sorbates and colorants such as erythrosine, effectively reproduce the total qualities of the aforesaid nitrites.

6 Claims, No Drawings

ADDITIVE COMPOSITION FOR REDUCED PARTICLE SIZE MEATS IN THE CURING THEREOF

This invention pertains to a composition which can replace sodium or potassium nitrite and/or nitrate in the production of cured meat products. By cured meat products is meant typically those products that contain meat which has been reduced in particle size by various processing procedures such as, grinding, cutting, chopping or emulsification, and which has been thoroughly mixed at some stage of the manufacturing cycle with the nitrite curing salts and numerous other curing ingredients. Frankfurters, thuringer, salami, and other sausages are typical cured meat products. The present composition consists of tertiary-butylhydroquinone (TBHQ) and a phosphate, and can also contain preservatives and colorants.

For many years, sodium and potassium nitrite have been used to produce cured beef, pork, poultry and fish. These chemicals along with salt and mild heat treatment produce a meat product with a pink color, characteristic cured flavor, and a fine texture. In addition, nitrites prevent the outgrowth of *Clostridium botulinum* and toxin formation during storage. The use of nitrites has been questioned recently because of their ability to react with secondary and tertiary amines to form nitrosamines. These highly toxic carcinogens have now been identified in some cured meat products.

The objective of this invention is to reproduce the effects obtained with nitrites in cured meat products by means of a composition of authorized food additives. The composition will allow the production of the characteristic cured meat flavor without use of nitrite.

The invention involves the addition to (no nitrite) meat of a mixture of from about 0.1 to 0.5% based on total product weight of one or more of the edible (FDA authorized food additive) phosphate salts, such as mono or disodium phosphate, sodium acid pyrophosphate, sodium pyrophosphate, sodium tripolyphosphate or sodium hexametaphosphate, and from 0.001 to 0.02% by weight of tertiary-butylhydroquinone. The mixture of phosphate salt and TBHQ is used in the amount of from about 0.1 to about 0.6% of the total meat product weight. From about 0.01 to 0.2% by weight of a preservative or preservatives chosen from sorbic acid or its edible (FDA authorized food additive) sodium and potassium salts, methyl paraben, sodium methyl paraben, ethyl paraben, sodium ethyl paraben, potassium ethyl paraben, propyl paraben, sodium propyl paraben, and potassium propyl paraben may also be included in the mixture. The mixture of phosphate salt, TBHQ, and preservative is used in the amount from about 0.1 to about 0.7% of the total meat product weight. Also, from about 0.001 to 0.005% based on weight of meat of colorants such as erythrosin (FD & C Red No. 3) or a lake of erythrosin containing an equivalent amount of pigment may be incorporated therein. The amount of the mixture of phosphate salt, TBHQ, preservatives, colorant, is used in the amount from about 0.1 to about 0.7% of the total meat product weight. The above percentage ranges for the edible phosphate salts, the TBHQ, the preservatives, and the colorant may be expressed in ratios based on phosphate salt of 500/1.0/10/1.0 to 5/1/10/0.25.

EXAMPLE 1

Frankfurters are made using the following formulation: 152 g. meat (50% beef, 50% pork), 2 g. sugar, 5 g. sodium chloride, 0.1 g. ascorbic acid, 40 g. water, 0.01 g. of tertiary-butylhydroquinone (TBHQ) dissolved in a convenient amount of propylene glycol), 0.007 g. erythrosine, 0.05 g. methyl paraben and 1 g. sodium tripolyphosphate. The mixture is emulsified and heated at 70°C. for 1 hour. The frankfurters have a desirable pink color and a good odor and flavor. They are stable for more than 4 weeks at 3°C. After exposure to light and air, the color of a cut surface of a frankfurter prepared in this manner fades more slowly than one prepared with nitrite.

EXAMPLE 2

Salami sausages are made using the following ingredients: 300 g. lean beef, 200 g. pork, 15 g. salt, 2.5 g. seasoning, 0.05 g. tertiarybutylhydroquinone TBHQ dissolved in a convenient amount of propylene glycol), 0.02 g. erythrosine, 0.25 g. propyl paraben, and 1.5 g. sodium tripolyphosphate. The meat is ground, ingredients thoroughly mixed, stuffed into casings and heat processed to an internal temperature of 68°C. Some of the sausages are also subjected to smoking. The salami sausage, both smoked and unsmoked, have good color, texture, flavor and microbiological stability.

EXAMPLE 3

Frankfurters are prepared as in Example 1 except using 0.05 g. of ethyl paraben, propyl paraben, the sodium and potassium salts of methyl, ethyl and propyl parabens alternatively in place of methyl paraben. Frankfurters prepared in this way are comparable with those prepared in Example 1.

EXAMPLE 4

Frankfurters are prepared as in Example 1 except using 0.15 g. of sorbic acid, sodium sorbate, and potassium sorbate alternatively in place of methyl paraben. Frankfurters prepared in this way are comparable with those prepared in Example 1.

EXAMPLE 5

Frankfurters are prepared as in Example 1 except using 0.03 g. of benzoic acid, sodium benzoate, sodium p-hydroxy benzoate, disodium ethylenediaminetetraacetic acid (EDTA), calcium disodium EDTA, dehydroacetic acid and sodium and potassium dehydroacetate alternatively in place of methyl paraben. Frankfurters prepared in this way are comparable with those prepared in Example 1.

EXAMPLE 6

Frankfurters are prepared in Examples 1, 3, 4 and 5 except using 1 g. of mono- and disodium phosphate, sodium pyrophosphate, sodium acid pyrophosphate and sodium hexametaphosphate alternatively in place of sodium tripolyphosphate. Frankfurters prepared in this way are comparable with those prepared in Example 1.

EXAMPLE 7

Salami sausages are prepared as in Example 2 except that 1.5 g. of mono- and disodium phosphate, sodium pyrophosphate and sodium acid pyrophosphate and sodium hexametaphosphate is used alternatively in place of sodium tripolyphosphate. Sausages prepared in this way are comparable with those prepared in Example 2.

EXAMPLE 8

Salami sausages are prepared as in Examples 2 and 7 except using 0.5 g. of sodium and potassium salts of sorbic acid and the free sorbic acid alternatively in place of the parabens. Sausages prepared in this way are comparable with those prepared in Example 2.

EXAMPLE 9

Salami sausages are prepared as in Examples 2, 7 and 8 except using 0.1 g. of methyl and ethyl paraben and the sodium and potassium salt of methyl, ethyl and propyl parabens alternatively in place of propyl paraben. Salami prepared in this way are comparable with those prepared in Example 2.

EXAMPLE 10

Salami sausages are prepared as in Examples 2, 7, 8 and 9 except using 0.05 g. of benzoic acid, sodium benzoate, sodium p-hydroxy benzoate, disodium EDTA, calcium disodium EDTA, dehydroacetic acid, and sodium and potassium dehydroacetate alternatively in place of the propyl paraben. Salami prepared in this way are comparable with those prepared in Example 2.

While the invention has been exemplified with salami and frankfurters it is not limited to these. As is obvious to one skilled in the art, the invention is useful in any type of cured meat including luncheon meats, other sausages and the like.

The parabens and sorbic acid and their alkali metal salts are felt to be the most effective preservatives in cured meat. However, suitable concentrations of other preservatives known to affect *C. botulinum* may also be used such as benzoic acid, sodium benzoate, sodium p-hydroxy benzoate, dehydroacetic acid, sodium and potassium dehydroacetate, disodium EDTA, and calcium disodium EDTA in concentrations of from about 0.01 to about 0.1% by weight of the meat.

Erythrosine produces the most satisfactory color in cured meat of all authorized food colorants; however, other colors authorized for use in food be used for shading as is obvious to one skilled in the art, as typified by dehydrated beet powder (betalains).

Other authorized ingredients such as spices, flavorings, cure accelerators, nonmeat binders, fillers or extenders, emulsifiers, liquid smoke, and additional additives which are obvious to one skilled in the art may be added to the meat mixtures described in this invention. Obviously, a wide variety of processing procedures, techniques and schedules can be followed while manufacturing meat products following the teachings of this invention.

I claim:

1. A composition for addition to reduced particle size meats in the curing thereof in the absence of added nitrites comprising a mixture of tertiary-butylhydroquinone and one or more salts selected from the group consisting of edible sodium and potassium salts of phosphoric, polyphosphoric, pyrophosphoric, orthophosphoric and metaphosphoric acids, wherein the ratio in parts by weight of the salt to the tertiary-butylhydroquinone is 500/1 to 5/1.

2. The composition of claim 1 wherein the mixture contains one or more preservatives selected from the group consisting of sorbic acid, potassium sorbate, sodium sorbate, methyl paraben, sodium methyl paraben, potassium methyl paraben, ethyl paraben, sodium ethyl paraben, potassium ethyl paraben, propyl paraben, sodium propyl paraben, potassium propyl paraben, benzoic acid, sodium benzoate, disodium ethylenediaminetetraacetic acid, calcium disodium ethylenediaminetetraacetic acid, dehydroacetic acid, sodium dehydroacetate and potassium dehydroacetate, the ratio in parts by weight of salt to the tertiary-butylhydroquinone and salt to the preservative is 500/1 to 5/1 and 50/1 to 1/2, respectively.

3. The composition of claim 2 containing erythrosine in a ratio of salt to erythrosine of 500/1 to 20/1.

4. Cured reduced particle size meat containing from about 0.1 to about 0.6% by weight of the composition of claim 1.

5. Cured reduced particle size meat containing from about 0.1 to about 0.7% by weight of the composition of claim 2.

6. Cured reduced particle size meat containing from about 0.1 to about 0.7% by weight of the composition of claim 3.

* * * * *